(12) United States Patent
Seo et al.

(10) Patent No.: US 12,049,272 B2
(45) Date of Patent: Jul. 30, 2024

(54) ROBOT

(71) Applicant: IUCF-HYU (INDUSTRY-UNIVERSITY COOPERATION FOUNDATION HANYANG UNIVERSITY), Seoul (KR)

(72) Inventors: Taewon Seo, Seoul (KR); Youngjoo Lee, Seoul (KR); Garam Park, Seoul (KR); Jiseok Lee, Seoul (KR); Joohyun Oh, Seoul (KR); Doopyo Yoon, Seoul (KR); Hobyeong Chae, Seoul (KR); Myoungjae Seo, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 17/920,913

(22) PCT Filed: Apr. 23, 2021

(86) PCT No.: PCT/KR2021/005141
§ 371 (c)(1),
(2) Date: Oct. 24, 2022

(87) PCT Pub. No.: WO2021/215866
PCT Pub. Date: Oct. 28, 2021

(65) Prior Publication Data
US 2024/0140545 A1   May 2, 2024

(30) Foreign Application Priority Data
Apr. 23, 2020  (KR) ........................ 10-2020-0049135

(51) Int. Cl.
*B62D 61/12* (2006.01)

(52) U.S. Cl.
CPC ................................... *B62D 61/12* (2013.01)

(58) Field of Classification Search
CPC ....................................................... B62D 61/12
See application file for complete search history.

(56) References Cited

U.S. PATENT DOCUMENTS 7,475,745 B1 * 1/2009 DeRoos ................. B62D 55/02
  180/8.1
11,498,632 B2 * 11/2022 Ishikawa ............ B60G 17/0162
(Continued)

FOREIGN PATENT DOCUMENTS

| CN | 214875227 U | * 11/2021 |
| JP | 2002-200990 A | 7/2002 |

(Continued)

OTHER PUBLICATIONS

International Search Report for PCT/KR2021/005141 dated Jul. 14, 2021.

*Primary Examiner* — Faye M Fleming
(74) *Attorney, Agent, or Firm* — Sughrue Mion, PLLC

(57) ABSTRACT

The present invention relates to a robot. A robot according to one embodiment of the present invention comprises: a body having a set volume: and a driving module provided in the left region and the right region of the body, respectively, and rotatably connected to the body by a rotation shaft, wherein the driving module comprises: a rotating member connected to the rotating shaft; a first driving part extending from one side of the rotating member slantwise by a first inclination angle with respect to the rotating shaft in a direction away from the rotating shaft; and a second driving part extending from the one side of the rotating member (Continued)

slantwise by a second inclination angle with respect to the rotating shaft in the direction away from the rotating shaft.

13 Claims, 8 Drawing Sheets

(56) References Cited

U.S. PATENT DOCUMENTS

| | | | | |
|---|---|---|---|---|
| 11,767,071 | B2 * | 9/2023 | Ishikawa | B62D 61/12 280/400 |
| 2002/0179342 | A1 | 12/2002 | Quinn et al. | |

FOREIGN PATENT DOCUMENTS

| | | | |
|---|---|---|---|
| JP | 2017-165154 | A | 9/2017 |
| KR | 10-1057469 | B1 | 8/2011 |
| KR | 10-1211786 | B1 | 12/2012 |
| KR | 10-1361491 | B1 | 2/2014 |
| KR | 10-2015-0065134 | A | 6/2015 |
| KR | 10-2018-0067604 | A | 6/2018 |

* cited by examiner

ROBOT

CROSS REFERENCE TO RELATED APPLICATIONS

This application is a National Stage of International Application No. PCT/KR2021/005141 filed Apr. 23, 2021, claiming priority based on Korean Patent Application No. 10-2020-0049135 filed Apr. 23, 2020.

TECHNICAL FIELD

The present invention relates to a robot, and more specifically, to a robot which can efficiently move over an upper surface of an obstacle located in a traveling direction of the robot.

BACKGROUND ART

A robot is generally configured to include a body and wheels or wheel-like structures rotatably located on left and right sides of the body. The robot moves on a ground according to the rotation of the wheels. An obstacle protruding from a plane may appear on the ground where the robot moves. In order for the robot to move over the obstacle through the wheels, it is required that a rotation shaft of the wheel is sufficiently higher than an upper end of the obstacle. Accordingly, a radius of the wheel with respect to the rotation shaft increases according to a height of the obstacle through which the robot moves while overcoming the same. As the radius of the wheel increases, the center of gravity of the robot also becomes higher, resulting in deterioration of traveling stability of the robot.

DISCLOSURE

Technical Problem

The present invention is to provide a robot which can efficiently travel.

In addition, the present invention is to provide a robot having a low center of gravity when traveling.

In addition, the present invention is to provide a robot having a body with a variable height.

In addition, the present invention is to provide a robot which can move while overcoming an obstacle higher than a center of gravity of the robot during traveling.

In addition, the present invention is to provide a robot which can efficiently move on a traveling surface inclined with respect to a horizontal plane, such as an exterior wall of a building.

Technical Solution

According to an aspect of the present invention, there may be provided a robot including: a body having a set volume; and traveling modules provided at left and right regions of the body, respectively, and rotatably connected to the body by a rotation shaft, wherein the traveling module includes: a rotation member connected to the rotation shaft; a first traveling portion configured to extend obliquely from one side of the rotation member by a first inclination angle with respect to the rotation shaft in a direction away from the rotation shaft; and a second traveling portion configured to extend obliquely from one side of the rotation member by a second inclination angle with respect to the rotation shaft in a direction away from the rotation shaft.

In addition, the second traveling portion may extend in a direction opposite to the first traveling portion based on a longitudinal direction of the rotation shaft.

In addition, the second traveling portion may be configured to be longer than the first traveling portion.

In addition, the rotation shaft may be configured obliquely downward by a set angle with respect to a plane including a front-rear direction and a left-right direction.

In addition, the second traveling portion may be configured to extend on a plane including a longitudinal direction of the rotation shaft and a longitudinal direction of the first traveling portion.

In addition, the rotation shaft may be configured obliquely downward by 45° with respect to a plane including a front-rear direction and a left-right direction.

In addition, the first inclination angle may be 45° or less.

In addition, the second inclination angle may be 45° or less.

In addition, the traveling module may include: a front traveling module located on left and right sides of a front region of the body; and a rear traveling module located on left and right sides of a rear region of the body.

In addition, the robot may further include: a front driving shaft having both ends respectively connected to the rotation shaft to which the front traveling module is connected; and a rear driving shaft having both ends respectively connected to the rotation shaft to which the rear traveling module is connected.

In addition, a first traveling wheel may be provided on a lower end portion of the first traveling portion, and a second traveling wheel may be provided on a lower end portion of the second traveling portion.

In addition, the robot may further include a fan provided fixedly to the body to generate airflow in an upward direction from a bottom.

In addition, the robot may further include a sensor configured to detect whether an obstacle exists against traveling.

Advantageous Effects

According to an embodiment of the present invention, it is possible to provide a robot which can efficiently travel.

In addition, according to an embodiment of the present invention, it is possible to provide a robot having a low center of gravity during traveling.

In addition, according to an embodiment of the present invention, it is possible to provide a robot having a body with a variable height.

In addition, according to an embodiment of the present invention, it is possible to provide a robot which can move while overcoming an obstacle higher than a center of gravity of the robot during traveling.

In addition, according to the present invention, it is possible is to provide a robot which can efficiently move on a traveling surface inclined with respect to a horizontal plane, such as an exterior wall of a building.

BEST MODE FOR INVENTION

Figure 1:
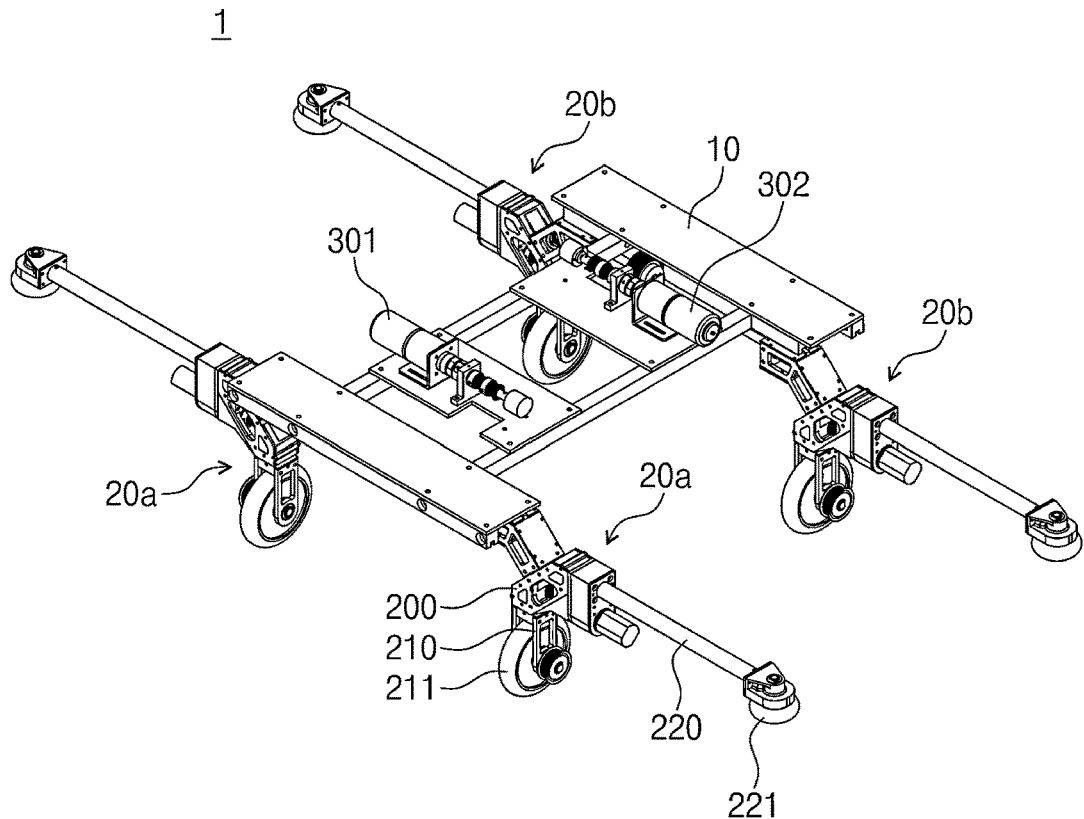
FIG. 1 is a view showing a schematic structure of a robot according to an embodiment of the present invention.

A robot according to the present invention may include: a body having a set volume; and traveling modules provided at left and right regions of the body, respectively, and rotatably connected to the body by a rotation shaft, wherein the traveling module includes: a rotation member connected to the rotation shaft; a first traveling portion configured to extend obliquely from one side of the rotation member by a first inclination angle with respect to the rotation shaft in a direction away from the rotation shaft; and a second traveling portion configured to extend obliquely from one side of the rotation member by a second inclination angle with respect to the rotation shaft in a direction away from the rotation shaft.

MODE FOR INVENTION

Hereinafter, preferred embodiments of the present invention will be described in detail with reference to the accompanying drawings. However, the present invention may be embodied in different forms and should not be construed as limited to the embodiments set forth herein. Rather, the embodiments are provided so that this disclosure will be thorough and complete, and will fully convey the scope of the present invention to those skilled in the art.

In the present specification, it will be understood that when an element is referred to as being "on" another element, it can be formed directly on the other element or intervening elements may be present. In the drawings, the thicknesses of layers and regions are exaggerated for clarity.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Embodiments explained and illustrated herein include their complementary counterparts. As used herein, the term "and/or" includes any and all combinations of one or more of the associated listed elements.

The singular expression also includes the plural meaning as long as it does not differently mean in the context. In addition, the terms "comprise", "have" etc., of the description are used to indicate that there are features, numbers, steps, elements, or combination thereof, and they should not exclude the possibilities of combination or addition of one or more features, numbers, operations, elements, or a combination thereof. Furthermore, it will be understood that when an element is referred to as being "connected" or "coupled" to another element, it may be directly connected or coupled to the other element or intervening elements may be present.

In addition, when detailed descriptions on related known functions or constitutions are considered to unnecessarily cloud the gist of the present invention in describing the present invention below, the detailed descriptions will not be included.

Figure 2:
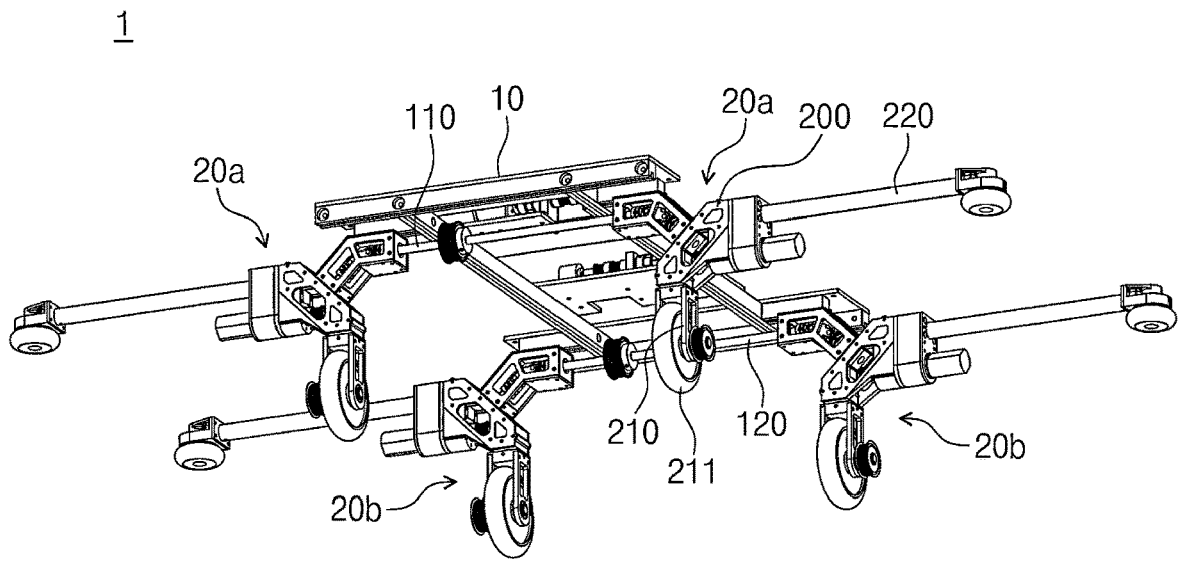
FIG. 2 is a view of the robot of FIG. 1, when viewed from the bottom.
Figure 3:
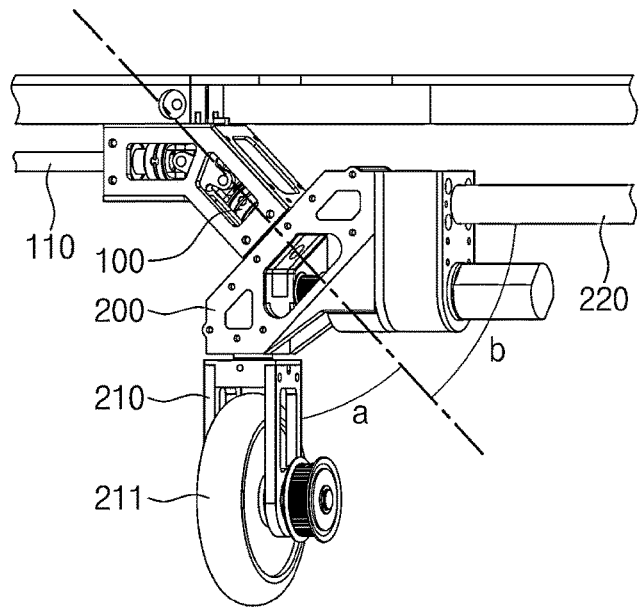
FIG. 3 is an enlarged view of a traveling module portion of the robot of FIG. 1.
Figure 4:
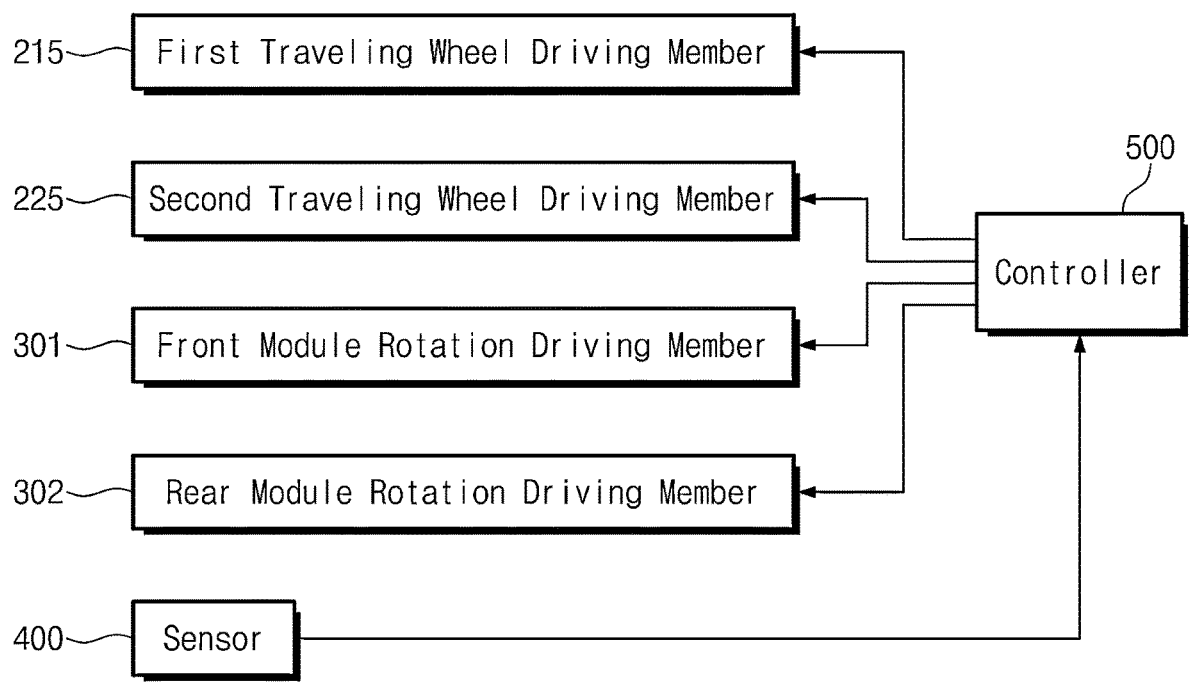
FIG. 4 is a view showing a control relationship of the robot of FIG. 1.

FIG. 1 is a view showing a schematic structure of a robot according to an embodiment of the present invention, FIG. 2 is a view of the robot of FIG. 1, when viewed from the bottom, FIG. 3 is an enlarged view of a traveling module portion of the robot of FIG. 1, and FIG. 4 is a view showing a control relationship of the robot of FIG. 1.

Referring to FIGS. 1 to 4, a robot 1 includes a body 10, traveling modules 20a and 20b, front module rotation driving member 301, rear module rotation driving member 302, a sensor 400, and a controller 500.

Hereinafter, a direction in which the robot 1 proceeds by the traveling modules 20a and 20b on a plane is referred to as a front-rear direction, and a direction perpendicular to the front-rear direction on the plane is referred to as a left direction and a right direction, and a direction perpendicular to the front-rear direction and the left-right direction is referred to as a vertical direction.

The body 10 is configured to have a set volume and a set length in the front-rear direction and the left-right direction.

The traveling modules 20a and 20b are provided on left and right regions of the body 10, respectively. The traveling modules 20a and 20b may be spaced apart from each other at a predetermined distance in the front-rear direction, and may be provided on lower left and right sides of a front region of the body 10 and lower left and right sides of a rear region of the body 10, respectively.

The traveling modules 20a located at the front region (hereinafter, front traveling modules 20a) and the traveling modules 20b located at the rear region (hereinafter, rear traveling modules 20b) are provided in structures corresponding to each other. Further, the traveling modules 20a and 20b located on the left side and the traveling modules 20a and 20b located on the right side are provided in structures corresponding to each other, in addition to being symmetrical with respect to the plane including the front-rear direction and the vertical direction. Accordingly, the traveling modules 20a and 20b located at four regions will be described together.

The traveling modules 20a and 20b include a rotation member 200, a first traveling portion 210, and a second traveling portion 220.

The rotation member 200 is connected to the body 10 by a rotation shaft 100. Accordingly, the rotation member 200 may rotate with respect to the body 10 by the rotation of the rotation shaft 100. As the rotation shaft 100 moves toward the rotation member 200, it may be configured obliquely downward by a set angle with respect to the plane including the front-rear direction and the left-right direction. For example, the rotation shaft 100 may be configured obliquely downward by the set angle with respect to the left-right direction. An angle at which the rotation shaft 100 is configured obliquely downward may be 45°.

The first traveling portion 210 may be formed to extend from one side of the rotation member 200 in a direction away from the rotation shaft 100. The first traveling portion 210 may be formed to extend on a plane including the rotation shaft 100. The first traveling portion 210 and the rotation shaft 100 are configured obliquely by a first inclination angle a. The first inclination angle a may be 45° or less. Preferably, the first inclination angle a may be 45°. The first traveling portion 210 is provided on a lower end portion with a first traveling wheel 211. When the first traveling portion 210 is located on a plane including the vertical direction and a longitudinal direction of the rotation shaft 100 (that is, when the lower end portion of the first traveling portion 210 is located toward a traveling surface), the first traveling wheel 211 may be configured to rotate about the left-right direction. In addition, the first traveling wheel 211 may be configured to rotate about a longitudinal direction of the first traveling portion 210.

A first traveling wheel driving member 215 is connected to the first traveling wheel 211. For example, the first traveling wheel driving member 215 may be provided as a motor or the like. The first traveling wheel driving member 215 may be directly connected to the shaft of the first traveling wheel 211, may be located to be spaced apart from the first traveling wheel 211 by a set distance, or may be connected to the first traveling wheel 211 using a belt, a pulley, a gear, etc.

The second traveling portion 220 may be formed to extend from one side of the rotation member 200 in the direction away from the rotation shaft 100. The second traveling portion 220 may be configured to be longer than the first traveling portion 210. For example, the length of the second traveling portion 220 may be configured to be longer than twice or more of the length of the first traveling portion 210. The second traveling portion 220 may be formed to extend on a plane including the longitudinal direction of the rotation shaft 100 and the longitudinal direction of the first traveling portion 210. The second traveling portion 220 and the rotation shaft 100 are configured obliquely by a second inclination angle b, in an opposite direction of the first traveling portion 210 based on the longitudinal direction of the rotation shaft 100. The second inclination angle b may be 45° or less. Preferably, the second inclination angle b may be 45°. The second traveling portion 220 is provided on a lower end portion with a second traveling wheel 221. When the second traveling portion 220 is located on the plane including the vertical direction and the longitudinal direction of the rotation shaft 100 (that is, the lower end portion of the second traveling portion 220 is located to face the traveling surface), the second traveling wheel 221 may be configured to rotate about the left-right direction. In addition, the second traveling wheel 221 may be configured to rotate about a longitudinal direction of the second traveling portion 220.

A second traveling wheel driving member 225 is connected to the second traveling wheel 221. For example, the second traveling wheel driving member 225 may be provided as a motor or the like. The second traveling wheel driving member 225 may be directly connected to the shaft of the second traveling wheel 221, may be located to be spaced apart from the second traveling wheel 221 by a set distance, or may be connected to the second traveling wheel 221 using a belt, a pulley, a gear, etc. The second traveling wheel driving member 225 may be provided integrally with or separately from the first traveling wheel driving member 215.

The front module rotation driving member 301 rotates the rotation shaft 100 of the front traveling module 20a to change the front traveling module 20a from a state where the first traveling portion 210 faces the traveling surface to a state where the second traveling portion 220 faces the traveling surface.

Upper end portions of the rotation shaft 100 of the front traveling modules 20a located on the left and right sides may be configured to be connected to both ends of a front driving shaft 110, respectively. An end portion of the front driving shaft 110 and the rotation shaft 100 of the front traveling module 20a may be connected by a universal joint having a plurality of hinge shafts. In addition, the front module rotation driving member 301 is connected to the front driving shaft 110, and as the front driving shaft 110 rotates, the rotation shaft 100 of the front traveling modules 20a located on the left and right sides may rotate together. For example, the front module rotation driving member 301 may be provided as a motor or the like, and connected to the front driving shaft 110 using a gear, a belt, a pulley, etc.

The rear module rotation driving member 302 rotates the rotation shaft 100 of the rear traveling module 20b to change the rear traveling module 20b from the state where the first traveling portion 210 faces the traveling surface to the state where the second traveling portion 220 faces the traveling surface.

Upper end portions of the rotation shaft 100 of the rear traveling modules 20b located on the left and right sides may be configured to be connected to both ends of a rear driving shaft 120, respectively. An end portion of the rear driving shaft 120 and the rotation shaft 100 of the rear traveling module 20b may be connected by a universal joint having a plurality of hinge shafts. In addition, the rear module rotation driving member 302 is connected to the rear driving shaft 120, and as the rear driving shaft 120 rotates, the rotation shaft 100 of the rear traveling modules 20b located on the left and right sides may rotate together. For example, the rear module rotation driving member 302 may be provided as a motor or the like, and connected to the rear driving shaft 120 using a gear, a belt, a pulley, etc.

The sensor 400 is located on one side of the body 10 or on the traveling modules 20a and 20b to detect whether an obstacle (ob in FIG. 6) exists against traveling. For example, the sensor 40 may be provided as an ultrasonic sensor, and may be configured to detect a distance from the object located in a proceeding direction, a shape of the object, etc. by receiving a sound wave reflected from an object after emitting ultrasonic waves. For another example, the sensor 400 may be provided as a rotation detection sensor, and may be configured to detect whether the first traveling wheel 211 rotates. Accordingly, when a rotation speed of the first traveling wheel 211 is less than that when the first traveling wheel 211 is driven or the rotation of the first traveling wheel 211 is not detected when the first traveling wheel 211 is driven, it may be detected that the obstacle ob exists in the proceeding direction.

The controller 500 controls components of the robot 1.

Figure 5:
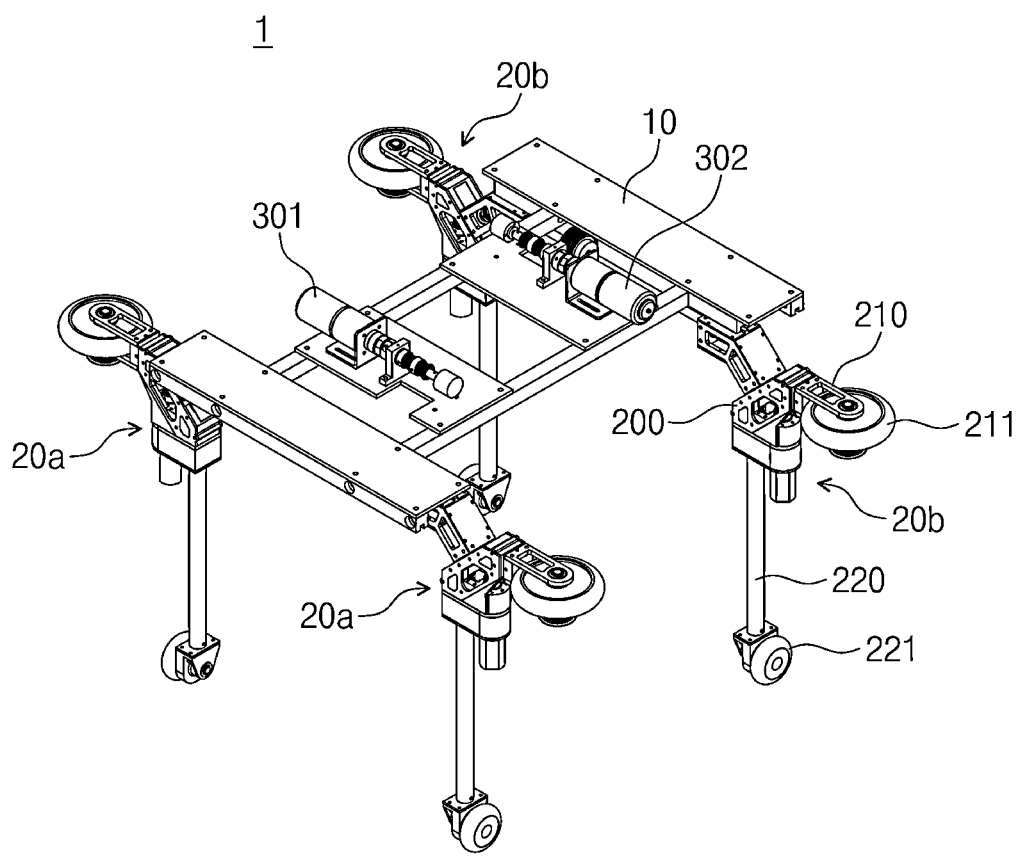
FIG. 5 is a view showing the robot of FIG. 1, which travels through a second traveling portion.

FIG. 5 is a view showing the robot of FIG. 1, which travels through a second traveling portion.

Referring to FIG. 5, the controller 500 may control the robot to change from a state of traveling through the first traveling portion 210 as shown in FIG. 1 to a state of traveling through the second traveling portion 220, during traveling of the robot 1. To this end, the controller 500 may operate the front module rotation driving member 301 and the rear module rotation driving member 302 to allow the second traveling portion 220 of the front traveling module 20a and the second traveling portion 220 of the rear traveling module 20b to face the traveling surface. In this case, the controller 500 may control the robot to change from the state of FIG. 1 to the state of FIG. 5 in such a way that the front traveling module 20a and the rear traveling module 20b rotate simultaneously or one of the front traveling module 20a and the rear traveling module 20b rotates first.

Figure 6:
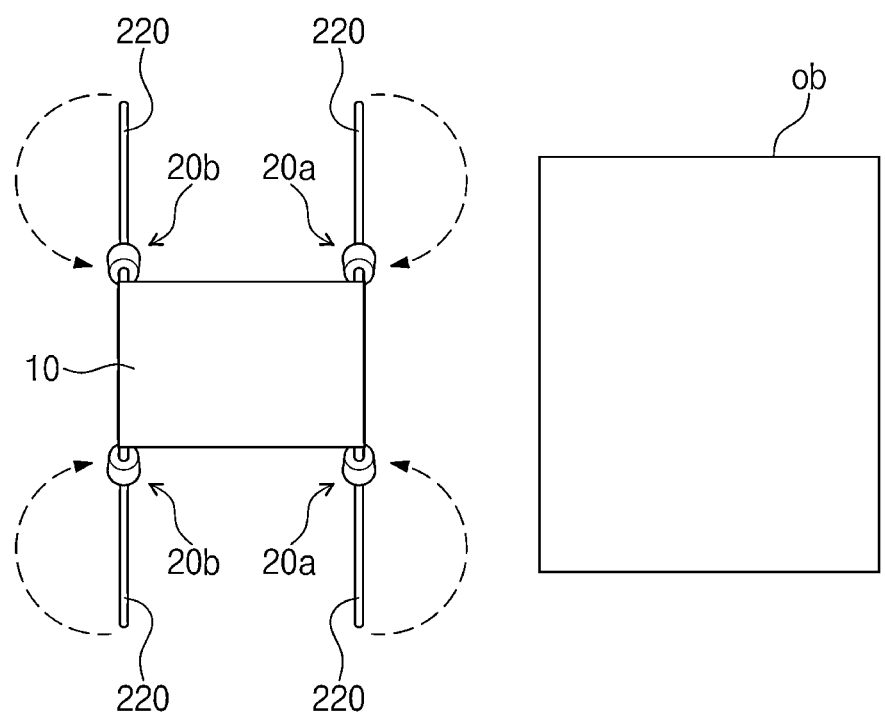
FIG. 6 is a schematic plan view showing a rotation direction of a traveling module, when it is changed from a state of FIG. 1 to a state of FIG. 5.

FIG. 6 is a schematic plan view showing a rotation direction of a traveling module, when changing from a state of FIG. 1 to a state of FIG. 5.

Referring to FIG. 6, when the controller 500 controls the robot to change from the state where the first traveling portion 210 of the front traveling module 20a faces the traveling surface to the state where the second traveling portion 220 faces the traveling surface, it may rotate the front traveling module 20a in a direction in which the second traveling portion 220 rotates forward. Further, when the controller 500 controls the robot to change from the state where the first traveling portion 210 of the rear traveling module 20b faces the traveling surface to the state where the second traveling portion 220 faces the traveling surface, it may rotate the rear traveling module 20b in a direction in which the second traveling portion 220 rotates rearward. Accordingly, it is possible to prevent that interference occurs between the front traveling module 20a and the rear traveling module 20b in a process of changing the traveling state of the robot 1.

FIGS. 7 to 10 are side views showing a process of the robot moving over an obstacle when the obstacle appears in a traveling direction.

In order to clearly show a movement process, FIGS. 7 to 10 show only the body 10, the first traveling portion 210, and the second traveling portion 220.

Hereinafter, a process in which the robot 1 moves over the obstacle ob will be described with reference to FIGS. 7 to 10. The robot 1 may move over the obstacle ob while proceeding forward or rearward. The process in which the robot moves over the obstacle ob while proceeding rearward is the same as the process in which the robot moves over the obstacle ob while proceeding forward, except that the front traveling module 20a and the rear traveling module 20b are reversed in the process in which the robot moves over the obstacle ob while proceeding forward. Hereinafter, the description will be made based on the process of moving over the obstacle ob while the robot travels forward.

Figure 7:
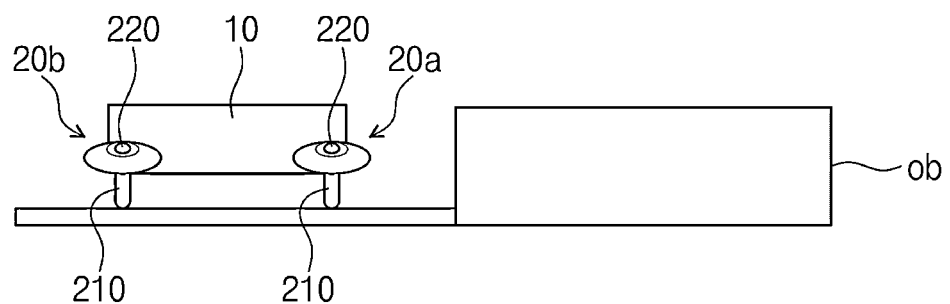
FIGS. 7 to 10 are side views showing a process of the robot moving over an obstacle when the obstacle appears in a traveling direction.

As shown in FIGS. 1 and 7, the robot 1 may generally travel in the state where the first traveling portion 210 faces the traveling surface. Accordingly, the robot 1 may stably travel due to the low center of gravity with respect to the traveling surface.

Figure 8:
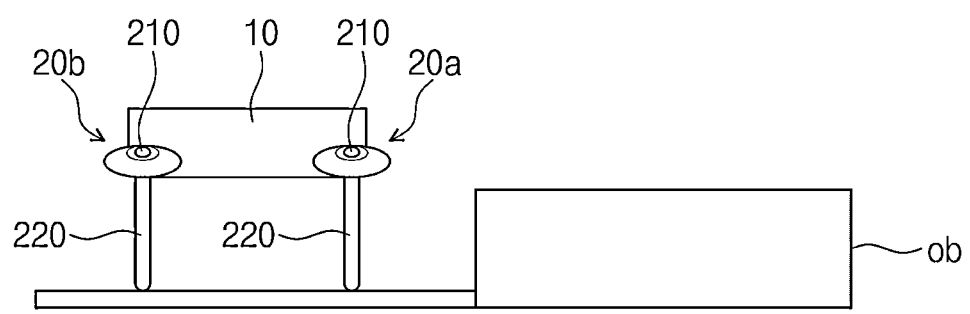

When the sensor 400 detects the obstacle ob in the traveling direction, as shown in FIGS. 5 and 8, the traveling modules 20a and 20b are changed to the state where the second traveling portion 220 faces the second traveling portion 220. In this case, in order to prevent interference between the rotation of the traveling modules 20a and 20b and the obstacle ob, the traveling state may be changed in a state where the robot 1 is located at a point spaced apart from the obstacle ob by a set distance.

Figure 9:
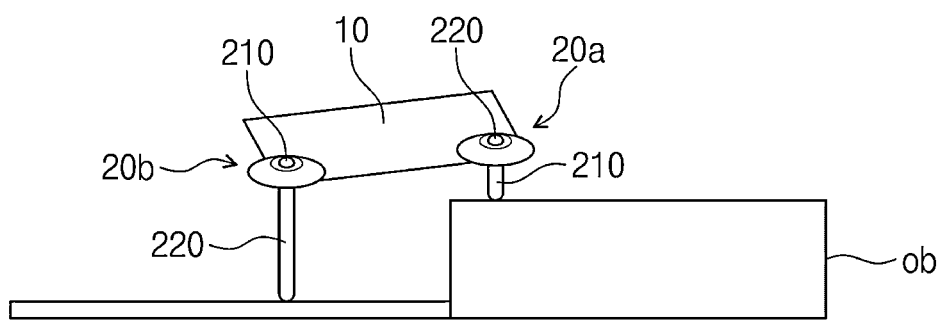

Thereafter, the robot 1 moves toward the obstacle ob and located at a point where a distance between the front traveling module 20a and an obstacle ob is shorter than the length of the first traveling portion 210. In addition, the front traveling module 20a rotates to change the state where the first traveling portion 210 faces the traveling surface. In this case, the front traveling module 20a rotates in such a way that the second traveling portion 220 faces the opposite direction of the obstacle ob, such that the interference between the second traveling portion 220 and the obstacle ob can be prevented. Accordingly, after the first traveling portion 210 rotates while moving upward and downward with respect to the obstacle ob, the first traveling portion 210 is located on the upper surface of the obstacle ob. When the rotation of the front traveling module 20a is completed, the first traveling portion 210 of the front traveling module 20a is located on the upper surface of the obstacle ob as shown in FIG. 9.

Figure 10:
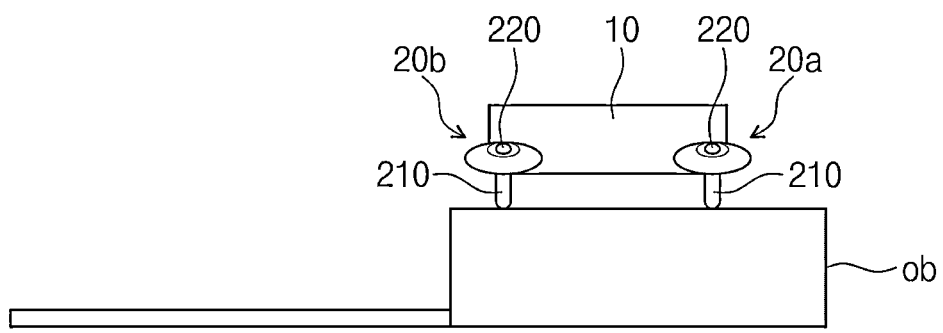

Thereafter, the robot 1 moves toward the obstacle ob and located at a point where a distance between the rear traveling module 20b and the obstacle ob is shorter than the length of the first traveling portion 210. In addition, the rear traveling module 20b rotates to change the state where the first traveling portion 210 faces the traveling surface. In this case, the rear traveling module 20b rotates in such a way that the second traveling portion 220 faces the opposite direction of the obstacle ob, such that the interference between the second traveling portion 220 and the obstacle ob can be prevented. Accordingly, after the first traveling portion 210 rotates while moving upward and downward with respect to the obstacle ob, the first traveling portion 210 is located on the upper surface of the obstacle ob. When the rotation of the rear traveling module 20b is completed, the first traveling portion 210 of the rear traveling module 20b is located on the upper surface of the obstacle ob as shown in FIG. 10.

Figure 11:
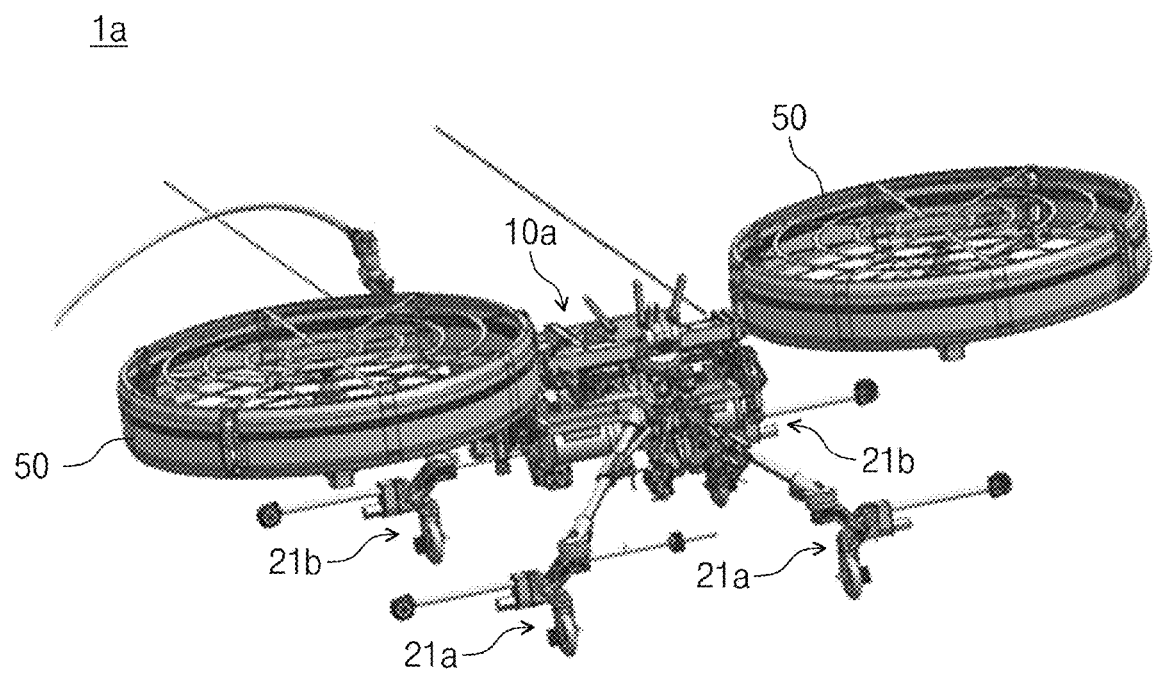
FIG. 11 is a view showing a robot according to another embodiment.
Figure 12:
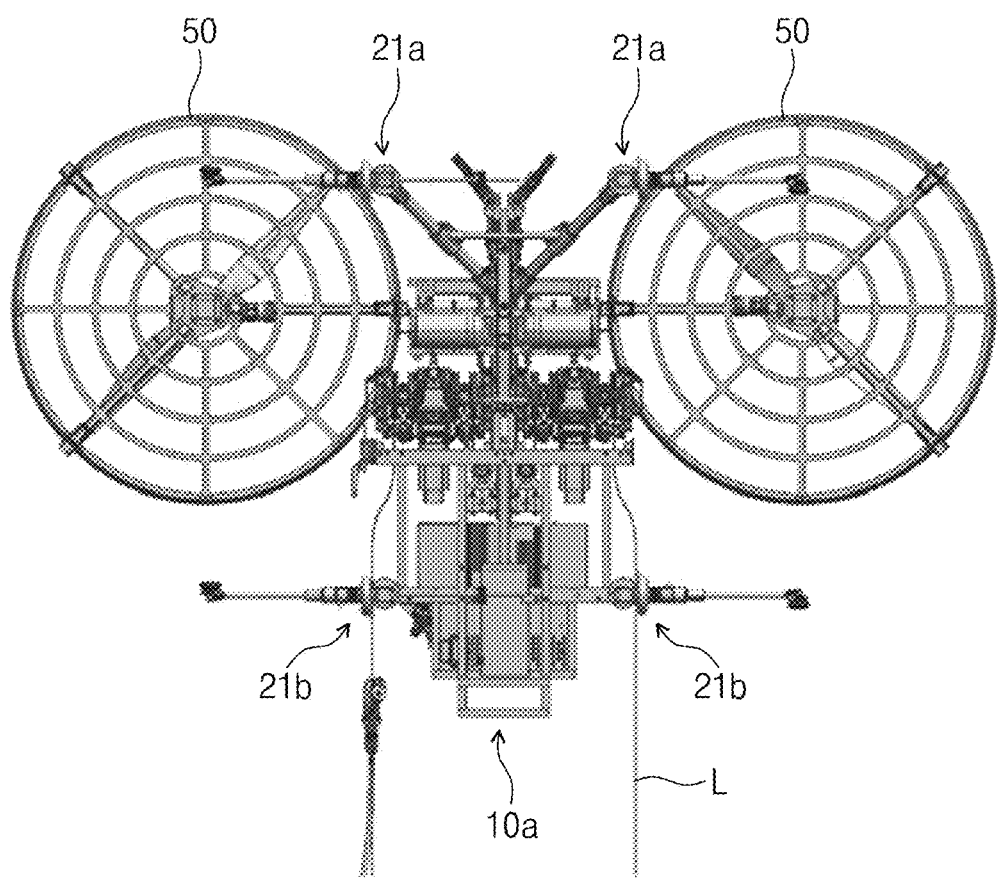
FIG. 12 is a bottom view of the robot of FIG. 11.

FIG. 11 is a view showing a robot according to another embodiment, and FIG. 12 is a bottom view of the robot of FIG. 11.

Referring to FIGS. 11 and 12, a robot 1a includes a body 10, traveling modules 21a and 21b, a front module rotation driving member (not shown), a rear module rotation driving member (not shown), a sensor (not shown), a fan 50, a connection unit 60, and a controller (not shown).

Since the traveling modules 21a and 21b, the sensor, the front module rotation driving member, the rear module rotation driving member, and the controller are the same as or similar to the robot 1 of FIG. 1, the repeated description will be omitted.

The fan 50 is fixedly provided to the body 10a. Two fans 50 are provided symmetrically to each other in left and right directions. The fan 50 is operated to generate airflow in an upward direction from a bottom. Accordingly, a force acts on the robot 1a in a downward direction from a top.

The connection unit 60 is fixed to the body 10a so that a line L provided as a wire, a rope, or the like is connected. For example, the connection unit 60 may be configured to be connected to the line L at two points symmetrical to the left and right directions.

Accordingly, the robot 1a may be configured to move on the traveling surface inclined with respect to a horizontal surface, such as an exterior wall of a building. In this case, the line L connected to the connection unit 60 may be fixed to an upper end of the building. In addition, the robot 1 may maintain a state in close contact with the traveling surface by the force generated by a unit of the fan 50.

While the present invention has been described in connection with the embodiments, it is not to be limited thereto but will be defined by the appended claims. In addition, it is to be understood that those skilled in the art can substitute, change or modify the embodiments in various forms without departing from the scope and spirit of the present invention.

INDUSTRIAL APPLICABILITY

The robot according to the present invention can travel while overcoming the obstacle.

The invention claimed is:
1. A robot comprising:
a body having a set volume; and
traveling modules provided at left and right regions of the body, respectively, and rotatably connected to the body by a rotation shaft,
wherein the traveling module includes:
a rotation member connected to the rotation shaft;
a first traveling portion configured to extend obliquely from one side of the rotation member by a first inclination angle with respect to the rotation shaft in a direction away from the rotation shaft; and a second traveling portion configured to extend obliquely from one side of the rotation member by a second inclination angle with respect to the rotation shaft in a direction away from the rotation shaft.

2. The robot of claim 1, wherein the second traveling portion extends in a direction opposite to the first traveling portion based on a longitudinal direction of the rotation shaft.

3. The robot of claim 1, wherein the second traveling portion is configured to be longer than the first traveling portion.

4. The robot of claim 1, wherein the rotation shaft is configured obliquely downward by a set angle with respect to a plane including a front-rear direction and a left-right direction.

5. The robot of claim 1, wherein the second traveling portion is configured to extend on a plane including a longitudinal direction of the rotation shaft and a longitudinal direction of the first traveling portion.

6. The robot of claim 1, wherein the rotation shaft is configured obliquely downward by 45° with respect to a plane including a front-rear direction and a left-right direction.

7. The robot of claim 1, wherein the first inclination angle is 45° or less.

8. The robot of claim 1, wherein the second inclination angle is 45° or less.

9. The robot of claim 1, wherein the traveling module includes:
   a front traveling module located on left and right sides of a front region of the body; and
   a rear traveling module located on left and right sides of a rear region of the body.

10. The robot of claim 9, further comprising:
    a front driving shaft having both ends respectively connected to the rotation shaft to which the front traveling module is connected; and
    a rear driving shaft having both ends respectively connected to the rotation shaft to which the rear traveling module is connected.

11. The robot of claim 1, wherein a first traveling wheel is provided on a lower end portion of the first traveling portion, and a second traveling wheel is provided on a lower end portion of the second traveling portion.

12. The robot of claim 1, further comprising:
    a fan provided fixedly to the body to generate airflow in an upward direction from a bottom.

13. The robot of claim 1, further comprising:
    a sensor configured to detect whether an obstacle exists against traveling.

* * * * *